(12) United States Patent
Talamacki et al.

(10) Patent No.: US 8,417,862 B2
(45) Date of Patent: Apr. 9, 2013

(54) INTER-VIRTUAL MACHINE INTERRUPT COALESCING

(75) Inventors: Varadaraj Talamacki, Fremont, CA (US); Vinu Velayudhan, Fremont, CA (US); Senthil Thangaraj, Fremont, CA (US); Sumant Kumar Patro, Fremont, CA (US)

(73) Assignee: LSI Corporation, San Jose, CA (US)

( * ) Notice: Subject to any disclaimer, the term of this patent is extended or adjusted under 35 U.S.C. 154(b) by 325 days.

(21) Appl. No.: 12/903,863

(22) Filed: Oct. 13, 2010

(65) Prior Publication Data
US 2012/0096206 A1    Apr. 19, 2012

(51) Int. Cl.
*G06F 9/48* (2006.01)
(52) U.S. Cl. .................... 710/263; 710/52; 718/108
(58) Field of Classification Search ............. 710/52, 710/54, 57, 263; 718/1, 108
See application file for complete search history.

(56) References Cited

U.S. PATENT DOCUMENTS
6,880,021 B2 *  4/2005 Easton et al. ............... 710/5
8,141,077 B2 *  3/2012 Cox ........................... 718/100
2003/0084213 A1 * 5/2003 Brice et al. ............... 710/48
2005/0132363 A1 * 6/2005 Tewari et al. ............. 718/1
2010/0223611 A1 * 9/2010 Mahalingam et al. ..... 718/1
2010/0274940 A1 * 10/2010 Ahmad et al. ............. 710/267

OTHER PUBLICATIONS

Ahmad, Irfan, et al., Improving Performance with Interrupt Coalescing for Virtual Machine Disk IO in VMware ESX Server; VMware, Inc., Palo Alto, CA.
Prof. A. Scholrollahi, Optimizing Network Performance in Virtual Machines, Ecole Polytechnique Federale de Lausanne, Jan. 27, 2009.

* cited by examiner

*Primary Examiner* — Glenn A Auve
(74) *Attorney, Agent, or Firm* — Alexander J. Neudeck; Cochran Freund & Young LLC

(57) ABSTRACT

Disclosed is a system with multiple virtual machines passing I/O requests via a shared memory space. A flag in shared memory is set to a first state in response to a first hypervisor I/O interrupt to indicate that an I/O processing routine is active (running). I/O requests are retrieved from an I/O queue in the shared memory by the I/O processing routine. Based on an indicator that there are no I/O requests remaining in said I/O queue, the shared flag is set to a second state to indicate that the I/O processing routine is deactivated (sleeping). In response to said shared flag being in the second state, when new I/O requests are going to be made, a second hypervisor I/O interrupt is generated. In response to said shared flag being in said first state, I/O requests are inserted into the I/O queue without generating a second hypervisor I/O interrupt.

17 Claims, 5 Drawing Sheets

INTER-VIRTUAL MACHINE INTERRUPT COALESCING

BACKGROUND OF THE INVENTION

Virtual machines allow multiple operating systems to be run simultaneously on the same computer hardware. This allows the sharing of the underlying physical machine resources (e.g., memory, I/O, etc.) between multiple operating systems (or instances of the same operating system). Virtual machines facilitate application provisioning, maintenance, high availability, and disaster recovery. The software layer providing the virtualization is typically called a virtual machine monitor or hypervisor. A hypervisor may run on bare hardware, or on top of an operating system.

SUMMARY OF THE INVENTION

An embodiment of the invention may therefore comprise a method of reducing hypervisor interrupts, comprising: setting a shared flag to a first state in response to a first hypervisor I/O interrupt, said shared flag being accessible to a first virtual machine and a second virtual machine; retrieving a plurality of I/O requests from an I/O queue; based on an indicator that there are no I/O requests remaining in said I/O queue, set said shared flag to a second state; in response to said shared flag being in said second state, generating a second hypervisor I/O interrupt; and, in response to said shared flag being in said first state, inserting an I/O request into said I/O queue without generating said second hypervisor I/O interrupt.

An embodiment of the invention may therefore further comprise a method of reducing context switches, comprising: preparing a first I/O request in a first virtual machine, the first virtual machine managed by a hypervisor; inserting the first I/O request into an I/O queue managed by said hypervisor; determining a state of an indicator, the indicator being based on a thread for processing the first I/O request being in a running state, the indicator being set by a second virtual machine managed by said hypervisor; and, in response to determining said state of said indicator is in a first state, generating a hypercall to said hypervisor that results in a context switch.

An embodiment of the invention may therefore further comprise a computer readable medium having instructions stored thereon for reducing context switches that, when executed by a computer, at least instruct the computer to: initiate a first virtual machine and a second virtual machine under the control of a hypervisor; in response to an I/O request by the first virtual machine, determine if a thread for processing said I/O request is in an active state on said second virtual machine; in response to said thread for processing said I/O request being in an active state, processing said I/O request; and, in response to said thread for processing said I/O request being in an inactive state, generating a hypervisor call that results in said thread for processing said I/O request being placed in an active state.

DETAILED DESCRIPTION OF THE EMBODIMENTS

Figure 1:
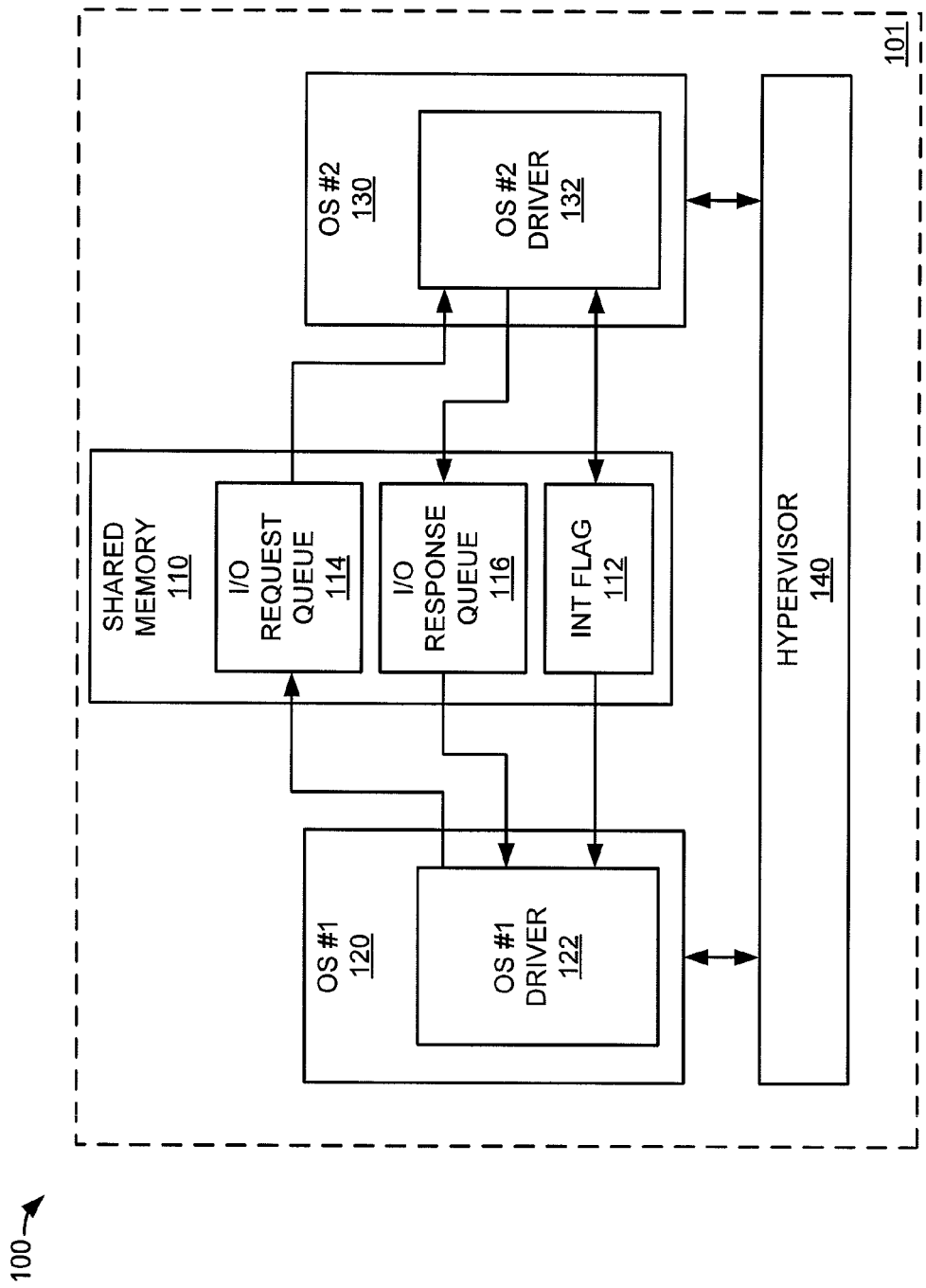
FIG. 1 is a block diagram of multiple virtual machines running on a computer.

FIG. 1 is a block diagram of multiple virtual machines running on a computer. In FIG. 1, virtual machine system 100 comprises software running on computer 101. Computer 101 includes shared memory 110. Shared memory 110 stores an interrupt flag 112, an I/O request queue 114, and an I/O response queue 116. Software running on computer 100 comprises operating system #1 (OS #1) 120, operating system #2 (OS #2) 130, and hypervisor 140. OS #1 120 includes I/O driver 122. OS #2 130 includes I/O driver 132. Shared memory 110 may be an area of computer 101's memory which is accessible from both OS #1 120 and OS #2 130.

Hypervisor 140 is operatively coupled to OS #1 120 and OS #2 130. OS #1 driver 122 is operatively coupled to receive flag 112 and I/O responses in I/O response queue 116 from shared memory 110. OS #1 driver 122 is operatively coupled to send I/O requests to I/O request queue 114 in shared memory 110. OS #2 driver 132 is operatively coupled to send and receive flag 112 to/from shared memory 110. OS #2 driver 132 is operatively coupled to receive I/O requests from I/O request queue 114 in shared memory 110.

In an embodiment, OS #1 120 and OS #2 130 are running as virtual machines under the supervision of hypervisor 140. OS #1 120 and OS #2 130 may be any guest operating systems compatible with hypervisor 140. For example, OS #1 120 and/or OS #2 130 may be a Windows, Apple, UNIX, Linux, or FreeBSD based operating systems. In an embodiment, OS #2 drive 132 may implement RAID functionality. In an embodiment, hypervisor 140 is the Xen hypervisor.

In an embodiment, OS #2 driver 132 is activated (or woken) by OS #2 130 in response to an interrupt or event from hypervisor 140. This event (and thus the activating of OS #2 driver 132) may be in response to a hypervisor call (hypercall) sent to hypervisor 140 by OS #1 120 or OS #1 driver 122. In response to being activated (i.e., placed in a running state), OS #2 driver 132 may set flag 112 to a first state. Also in response to being activated, OS #2 driver 132 may retrieve any I/O requests stored in I/O request queue 114. The I/O requests stored in I/O request queue 114 may have been placed there by OS #1 driver 122 or other components of other virtual machine operating systems (not shown in FIG. 1). OS #2 driver 132 may then process these I/O request and place the results in I/O response queue 116. OS #1 driver 122 may retrieve the results of the I/O requests it made from I/O response queue 116. In an embodiment, OS #1 driver 122 may place additional I/O requests into I/O request queue 114 while OS #2 driver 132 is processing previous I/O requests.

Once OS #2 driver 132 has processed all of the I/O requests in I/O request queue 114 (including any additional I/O requests that were place in I/O request queue 114 while it was processing other I/O requests), OS #2 driver 132 may set flag 112 to a second state in preparation to deactivate (i.e., go to sleep). OS #2 driver 132 may set flag 112 to the second state based on an indicator (e.g., a "queue empty" flag) that there are no I/O requests remaining in I/O request queue 114. After OS #2 driver 132 sets flag 112 to the second state (thus indicating it is going to sleep or is sleeping), OS #2 is deactivated (i.e., put to sleep) by OS #2 130.

As discussed previously, OS #1 driver 122 may insert additional I/O requests into I/O request queue 114 while OS #2 driver 132 is activated (running). After OS #1 driver 122 has inserted additional I/O requests, OS #1 driver 122 may read shared memory 110 to determine the state of flag 112. If the state of flag 112 is in the first state, it indicates that OS #2 driver 132 is still running. Because OS #2 driver 132 is in an active state, OS #1 driver 122 does not need to generate a hypercall to activate (e.g., wake-up) OS #2 driver to process the new I/O requests. Compared to generating a hypercall and passing it to hypervisor 140, this saves: (1) the processing by OS #1 driver 122 required to generate the hypercall; and, (2) the processing by hypervisor 140 to generate and forward and interrupt (event) to OS #2 driver 132. In addition, not generating a hypercall to activate OS #2 driver 132 saves at least a context switch to hypervisor 140 and another context switch to OS #2 130 to wake up OS #2 driver 132.

If the state of flag 112 is in the second state, it indicates that OS #2 driver 132 is inactive (i.e., sleeping). Thus, OS #1 driver 122 generates a hypercall and sends it to hypervisor 140 to activate OS #2 driver 132.

Figure 2:
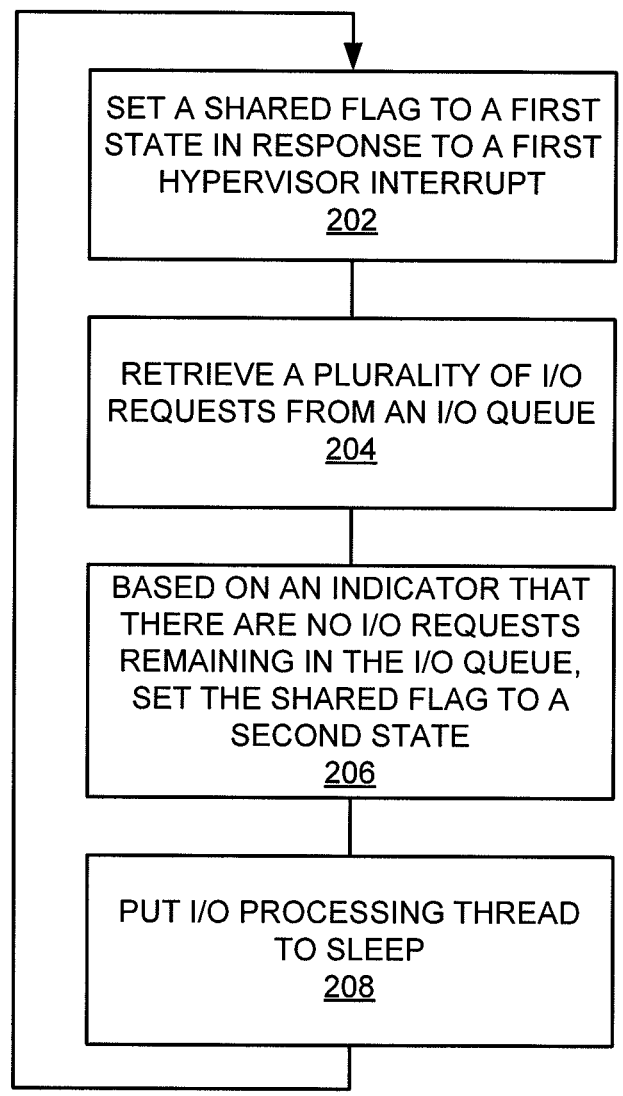
FIG. 2 is a flowchart of a method of setting a shared flag.

FIG. 2 is a flowchart of a method of setting a shared flag. The steps illustrated in FIG. 2 may be performed by one or more elements of virtual machine system 100. A shared flag is set to a first state in response to a hypervisor interrupt (i.e., event) (202). For example, OS #2 driver 132 may set flag 112 in response to being activated as a result of receiving a hypervisor event from hypervisor 140. A plurality of I/O requests are retrieved from an I/O queue (204). For example, OS #2 driver 132 may retrieve I/O requests from I/O request queue 114. OS #2 driver may process these requests, (i.e., performing I/O or other operations associated with the requests) and return results to I/O response queue 116.

Based on an indicator that there are no I/O requests remaining in the I/O queue, the shared flag is set to a second state (206). For example, OS #2 may set flag 112 to a second state as it prepares to go to sleep (i.e., deactivate) in response to having no more I/O requests remaining in I/O request queue 114 to process. The I/O processing thread is put to sleep (208). For example, OS #2 130 and/or OS #2 driver 132 may put OS #2 driver 132 to sleep as a result of OS #2 driver 132 having no more I/O requests in I/O request queue 114 to process.

Figure 3:
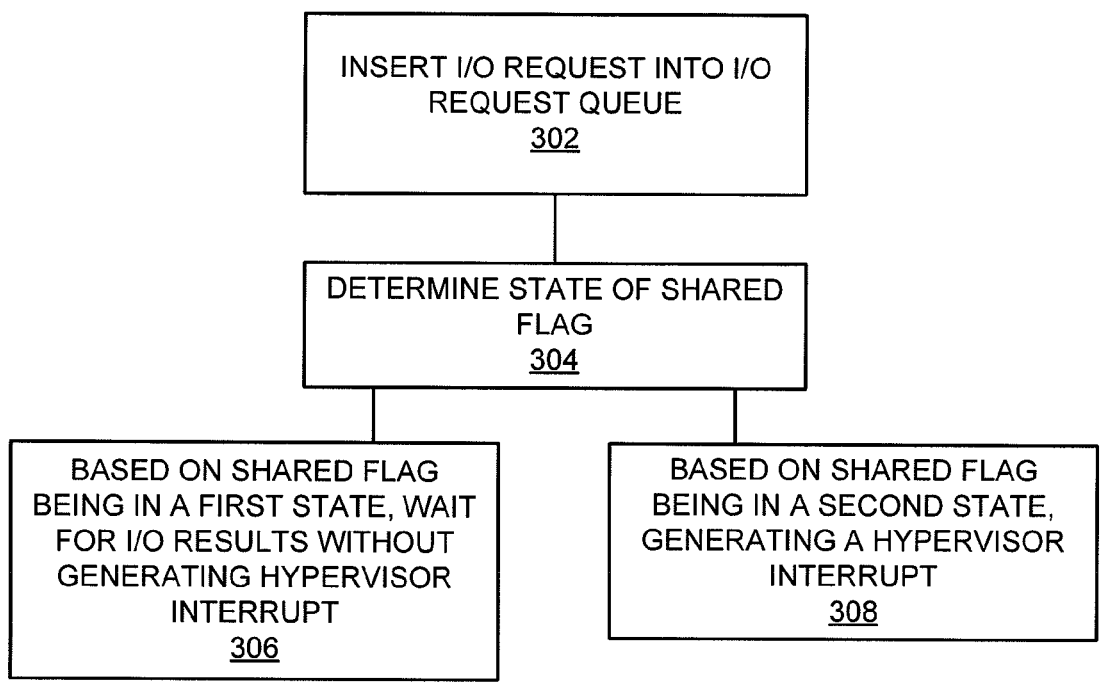
FIG. 3 is a flowchart of a method of using a shared flag to reduce context switches.

FIG. 3 is a flowchart of a method of using a shared flag to reduce context switches. The steps illustrated in FIG. 3 may be performed by one or more elements of virtual machine system 100. I/O requests are inserted into an I/O request queue (302). For example, OS #1 driver may insert I/O requests into I/O request queue 114 for processing by OS #2 driver 132. The state of a shared flag is determined (304). For example, OS #1 driver 122 may read flag 112 in shared memory 110 to determine its state. If the shared flag is in a first state, flow proceeds to block 306. If the shared flag is in a second state, flow proceeds to block 308.

Based on the shared flag being in the first state, in block 306, the system waits for I/O results without generating a hypervisor interrupt (306). For example, based on flag 112 being in a first state, OS #1 driver 122 may wait for I/O results in I/O response queue 116 without first generating a hypervisor interrupt and without sending that hypervisor interrupt to hypervisor 140. Based on the shared flag being in the second state, in block 308, the system generates a hypervisor interrupt (308). For example, based on flag 112 being in a second state, OS #1 driver 122 may generating a hypervisor interrupt and send that hypervisor interrupt to hypervisor 140. The hypervisor interrupt may cause OS #2 driver 132 to awaken and start processing the I/O request in I/O request queue 114.

Figure 4:
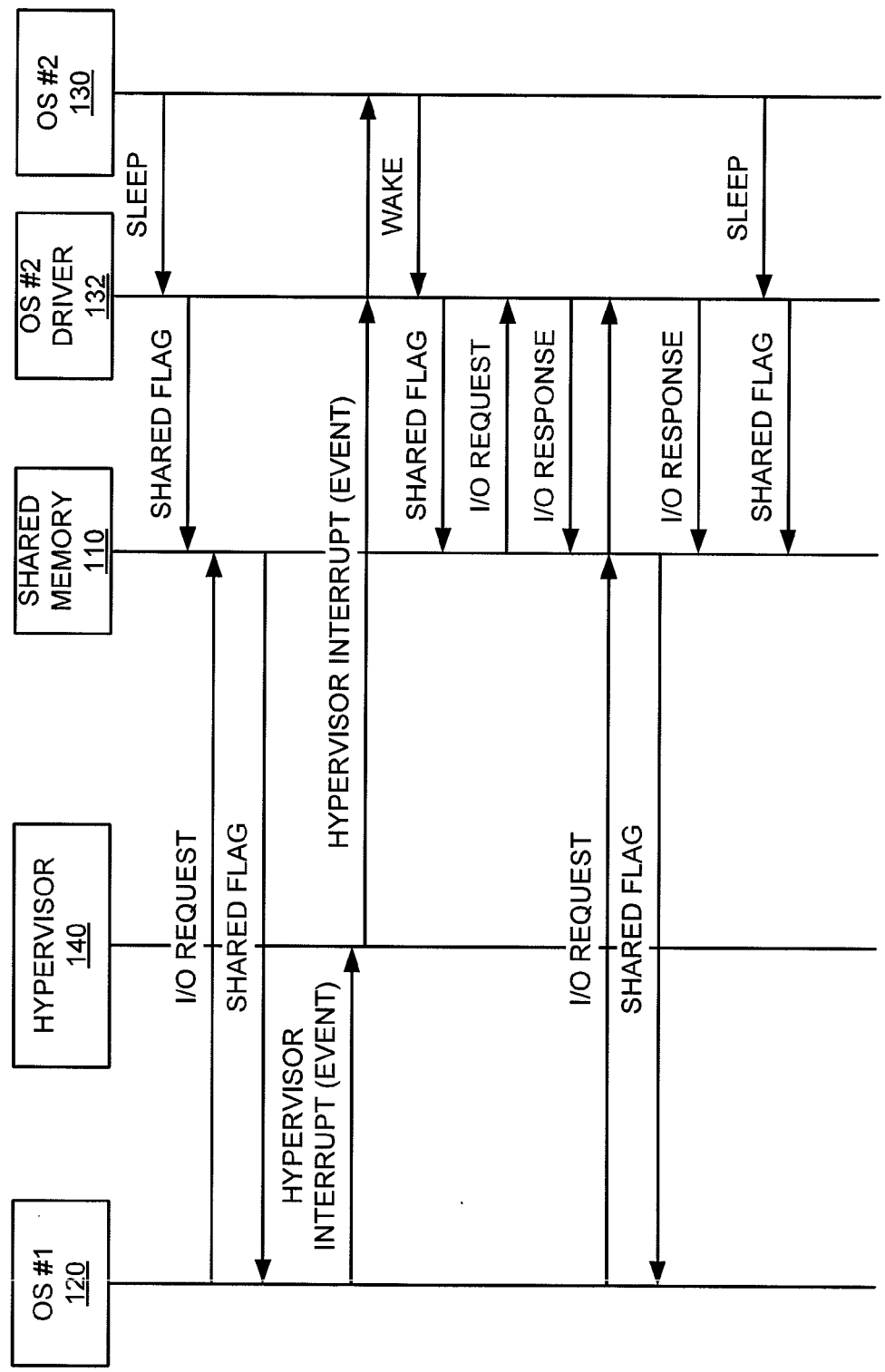
FIG. 4 is a flow diagram of a method of reducing context switches.

FIG. 4 is a flow diagram of a method of reducing context switches. In FIG. 4, OS #2 130 optionally sends a sleep signal to OS #2 driver 132 after it has been initialized to put OS #2 thread to sleep. Before going to sleep OS #2 driver 132 sets a shared flag in shared memory 110 to a first state that indicates OS #2 driver 132 is sleeping.

OS #1 120 sends an I/O request to shared memory 110. For example, OS #1 may write an I/O request into I/O request queue 114. OS #1 130 also (either before or after sending the I/O request) reads the shared flag from shared memory 110. For example, OS #1 driver 132 may read flag 112 from shared memory 110. Since the shared flag is in a first state that indicates OS #2 driver 132 is sleeping, OS #1 120 sends a hypervisor interrupt to hypervisor 140. Hypervisor 140 sends a hypervisor interrupt to OS #2 driver 132 and/or OS #2 132. OS #2 optionally sends a wake signal or performs other processing to wake OS #2 driver 132.

After waking, OS #2 driver 132 sets the shared flag in shared memory 110 to a second state that indicates OS #2 driver 132 is awake and processing I/O requests. OS #2 driver 132 receives I/O requests from shared memory 110. For example OS #2 driver 132 may receive I/O requests from I/O request queue 114 that were stored by OS #1 120.

After processing one or more I/O requests, OS #2 driver sends an I/O response to shared memory 110. For example, OS #2 driver may write I/O responses to I/O response queue 116. OS #1 120 also (either before or after receiving one or more responses to previous I/O requests) sends a second I/O request to shared memory 110 while OS #2 driver 132 is still active. This second I/O request is read by OS #2 driver 132. In an embodiment, OS #2 driver 132 continues to process I/O requests in I/O request queue 114 until I/O request queue 114 is empty.

OS #1 120 (either before or after sending the I/O request) reads the shared flag from shared memory 110. Since the shared flag is in a second state that indicates OS #2 driver 132 is running, OS #1 120 does not send a hypervisor interrupt to hypervisor 140. OS #2 driver 132 sends an I/O response to shared memory 110. Once all the pending I/O requests in I/O request queue 114 have been processed, OS #2 130 optionally sends a sleep signal to OS #2 driver 132 after it has been initialized to put OS #2 driver 132 thread to sleep. Alternatively, OS #2 driver 132 may put itself to sleep by returning program execution to OS #2 130, or a system call. Before going to sleep OS #2 driver 132 sets a shared flag in shared memory 110 to a first state that indicates OS #2 driver 132 is sleeping.

The systems, software, operating systems, hypervisors, and functions described above may be implemented with or executed by one or more computer systems. The methods described above may be stored on a computer readable medium. Many of the elements of virtual machine system 100 may be, comprise, or include computers systems. This includes, but is not limited to computer 101.

Figure 5:
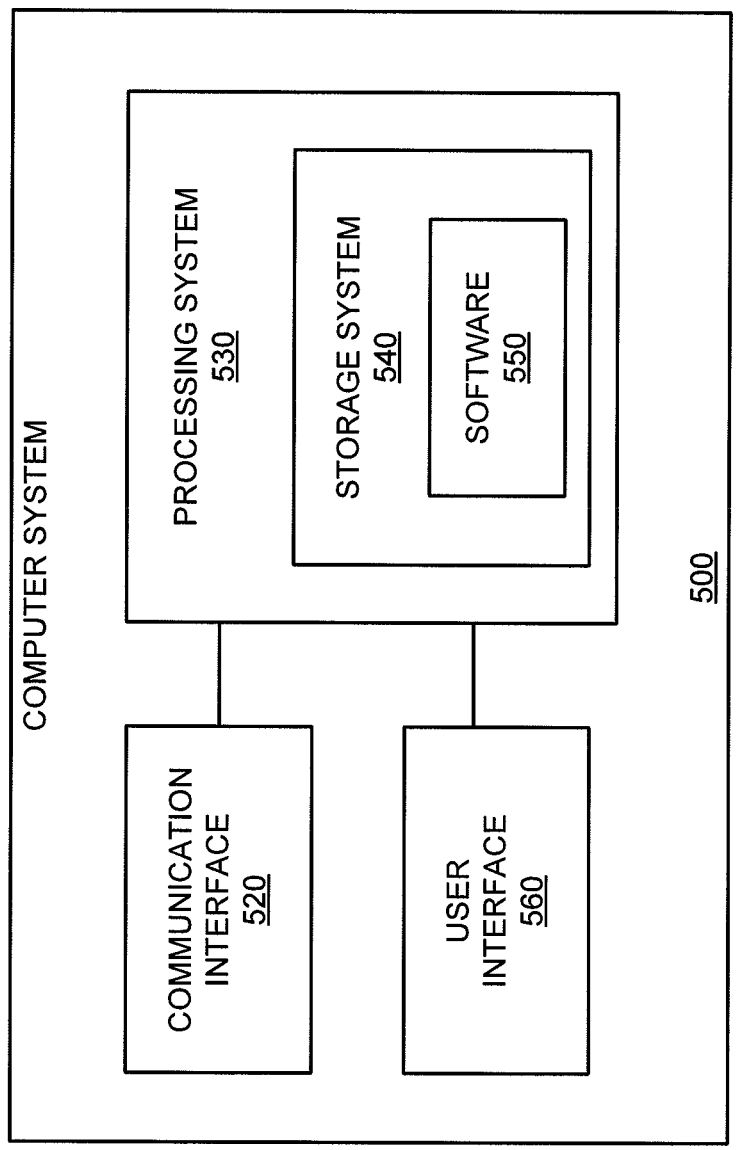
FIG. 5 is a block diagram of a computer.

FIG. 5 illustrates a block diagram of a computer system. Computer system 500 includes communication interface 520, processing system 530, storage system 540, and user interface 560. Processing system 530 is operatively coupled to storage system 540. Storage system 540 stores software 550 and data 570. Processing system 530 is operatively coupled to communication interface 520 and user interface 560. Computer system 500 may comprise a programmed general-purpose computer. Computer system 500 may include a microprocessor. Computer system 500 may comprise programmable or special purpose circuitry. Computer system 500 may be distributed among multiple devices, processors, storage, and/or interfaces that together comprise elements 520-570.

Communication interface 520 may comprise a network interface, modem, port, bus, link, transceiver, or other communication device. Communication interface 520 may be distributed among multiple communication devices. Processing system 530 may comprise a microprocessor, microcontroller, logic circuit, or other processing device. Processing system 530 may be distributed among multiple processing devices. User interface 560 may comprise a keyboard, mouse, voice recognition interface, microphone and speakers, graphical display, touch screen, or other type of user interface device. User interface 560 may be distributed among multiple interface devices. Storage system 540 may comprise a disk, tape, integrated circuit, RAM, ROM, network storage, server, or other memory function. Storage system 540 may be a computer readable medium. Storage system 540 may be distributed among multiple memory devices.

Processing system 530 retrieves and executes software 550 from storage system 540. Processing system may retrieve and store data 570. Processing system may also retrieve and store data via communication interface 520. Processing system 550 may create or modify software 550 or data 570 to achieve a tangible result. Processing system may control communication interface 520 or user interface 570 to achieve a tangible result. Processing system may retrieve and execute remotely stored software via communication interface 520.

Software 550 and remotely stored software may comprise an operating system, utilities, drivers, networking software, and other software typically executed by a computer system. Software 550 may comprise an application program, applet, firmware, or other form of machine-readable processing instructions typically executed by a computer system. When executed by processing system 530, software 550 or remotely stored software may direct computer system 500 to operate as described herein.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of reducing hypervisor interrupts, comprising:
    setting a shared flag to a first state in response to a first hypervisor I/O interrupt, said shared flag being accessible to a first virtual machine and a second virtual machine;
    retrieving a plurality of I/O requests from an I/O queue;
    based on an indicator that there are no I/O requests remaining in said I/O queue, set said shared flag to a second state;
    in response to said shared flag being in said second state, generating a second hypervisor I/O interrupt; and,
    in response to said shared flag being in said first state, inserting an I/O request into said I/O queue without generating said second hypervisor I/O interrupt.

2. The method of claim 1, further comprising:
    processing, by a first virtual machine, said plurality of I/O requests.

3. The method of claim 2, wherein said first virtual machine sets said shared flag to said second state in response to a thread that processes said plurality of I/O requests being placed in a dormant state.

4. The method of claim 3, wherein a second virtual machine inserts said I/O request and said plurality of I/O requests into said I/O queue.

5. The method of claim 4, wherein said first virtual machine is configured as a storage server.

6. The method of claim 4, wherein said first virtual machine is configured as a RAID server.

7. A method of reducing context switches, comprising:
    preparing a first I/O request in a first virtual machine, said first virtual machine managed by a hypervisor;
    inserting said first I/O request into an I/O queue managed by said hypervisor;
    determining a state of an indicator, said indicator being based on a thread for processing said first I/O request being in a running state, said indicator being set by a second virtual machine managed by said hypervisor; and,
    in response to determining said state of said indicator is in a first state, generating a hypercall to said hypervisor that results in a context switch.

8. The method of claim 7, wherein said context switch switches a CPU running said first virtual machine to running said hypervisor.

9. The method of claim 8, wherein said thread for processing said first I/O request processes said first I/O request without receiving an interrupt from said hypervisor.

10. The method of claim 8, further comprising:
    in response to said hypercall, generating an interrupt to said second virtual machine; and,
    in response to said interrupt, setting said thread for processing said first I/O request to a running state.

11. The method of claim 7, further comprising:
    using said thread for processing said first I/O request to respond to said first I/O request.

12. A non-transitory computer readable medium having instructions stored thereon for reducing context switches that, when executed by a computer, at least instruct the computer to:
    initiate a first virtual machine and a second virtual machine under the control of a hypervisor;
    in response to an I/O request by said first virtual machine, determine if a thread for processing said I/O request is in an active state on said second virtual machine;
    in response to said thread for processing said I/O request being in an active state, processing said I/O request; and,
    in response to said thread for processing said I/O request being in an inactive state, generating a hypervisor call that results in said thread for processing said I/O request being placed in an active state.

13. The non-transitory computer readable medium of claim 12, wherein said second virtual machine is a storage server.

14. The non-transitory computer readable medium of claim 13, wherein said second virtual machine is configured as a RAID server.

15. The non-transitory computer readable medium of claim 14, wherein said computer is further instructed to:
    maintain a shared indicator in a shared memory space, said shared indicator indicating whether said thread for processing said I/O request is in an active state and indicating whether said thread for processing said I/O request is in an inactive state.

16. The non-transitory computer readable medium of claim 14, wherein said shared indicator is maintained by said second virtual machine.

17. The non-transitory computer readable medium of claim 16, wherein said shared indicator is maintained by said thread for processing said I/O request.

* * * * *